Dec. 12, 1967     C. BETRIX     3,357,754
ARRANGEMENT FOR AXIALLY GUIDING A CYLINDRICAL MEMBER
Filed Nov. 2, 1964
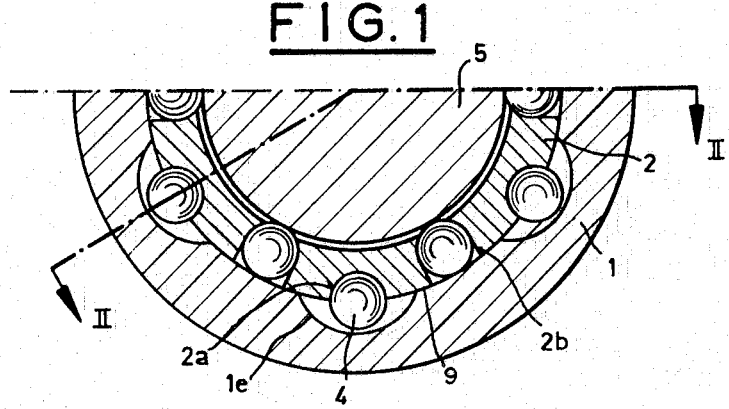
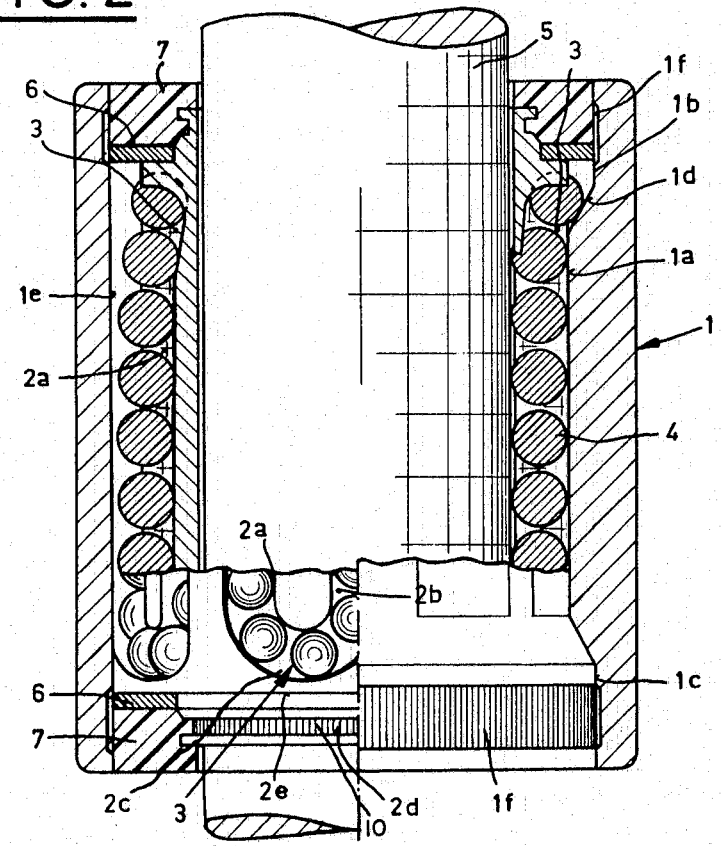
INVENTOR
CLAUDE BETRIX United States Patent Office 3,357,754
Patented Dec. 12, 1967

3,357,754
ARRANGEMENT FOR AXIALLY GUIDING
A CYLINDRICAL MEMBER
Claude Bétrix, Peseux, Switzerland, assignor to Sferax
S.A., Cortaillod, Switzerland, a firm
Filed Nov. 2, 1964, Ser. No. 408,092
Claims priority, application Switzerland, Nov. 4, 1963,
13,497/63
1 Claim. (Cl. 308—6)

ABSTRACT OF THE DISCLOSURE

This invention has for its object an arrangement for guiding the axial movement of a cylindrical member, of the type including a sleeve inside which said member is guided by balls brought into contact with said member through the agency of a tubular cage housed inside said sleeve, while means lock axially the cage inside said sleeve.

---

Arrangements of such a type are already known wherein the cage is locked inside the sleeve by means of an intermediate ring urged with a tight fit inside the latter. My invention has for its object an arrangement for guiding the axial movement of a cylindrical member of the precedingly referred to type wherein the locking means are constituted by at least one mass of plastic material cast so as to set in contact with the cage and sleeve.

I have illustrated by way of example in the accompanying drawing a preferred embodiment of my invention.

In said drawing:

FIG. 1 is a transverse cross-section of the arrangement, while

FIG. 2 is a cross-section through line II—II of FIG. 1.

The arrangement illustrated includes a sleeve 1 inside which is housed a tubular cage 2 provided inwardly with six cut tracks 3 along which may run a corresponding series of balls 4 in contact with which the cylindrical member 5 moves during its axial progression.

The inner surface of the sleeve 1 is subdivided into three sections of different diameters, the section 1a the bore diameter of which matches the outer diameter of the cage 2 and the sections 1b and 1c extending to either side of the section 1a, and merging into it through the frusto-conical surface 1d. The diameters of the sections 1b and 1c are larger than that of the section 1a.

Said central section 1a is furthermore provided with six longitudinal grooves 1e cut therein at angularly equidistant positions, said grooves having a rounded cross-section and their depth being such that the spacing between the bottom surfaces of two diametrically opposed grooves is equal to the inner diameter of the sections 1b and 1c. The breadth of the grooves 1e measured in registry with the surface of the section 1a on the sleeve is substantially equal to the breadth of the blank surfaces separating the grooves, also measured in registry with the same surface.

The sections 1b and 1c are furthermore provided with axial striations 1f the purpose of which will be disclosed hereinafter.

The tubular cage 2 is provided in its outer surface with six longitudinal equidistant grooves cut therein as shown at 2a and it is furthermore provided with six slots 2b cut therein parallel to said grooves 2a and each connected with one of the latter at each end through the incurved segments 2c; said grooves and slots form thus six races 3 for the balls 4.

The slots 2b are each spaced with reference to the corresponding groove 2a by an amount equal to the distance separating the medial plane of a groove 1e in the sleeve 1 from the medial plane passing through either of the blank surfaces or ribs defined between said groove 1e and the next groove 1e.

The length of said slots 2b and that of the grooves 2a is substantially equal to the length of the section 1a of the sleeve while the incurved sections terminating the grooves as shown at 2c extend beyond the slots 2b and the grooves 2a over a distance substantially equal to the length of the frusto-conical portions 1d of the sleeve 1.

The cross-section of the slots 2b matches that of the balls so that the latter cannot escape through said slots.

As illustrated, the cage 2 is fitted inside the sleeve in a manner such that its grooves 2a and its slots 2b lie respectively in registry with the grooves 1e of the sleeve and with the ribs 9 defined between the latter. The balls 4 are thus brought into contact with the shaft 5 forming the cylindrical member to be guided only while they run in the slots 2b and they are released with reference to the load produced by said contact when they run in the incurved sections 2c and in the grooves 2a.

At each end, the cage 2 is provided furthermore with an annular groove 2d the bottom of which has striations 10 and with a bearing surface 2e on which is fitted a washer 6 closing the annular passageway remaining free between the cage 2 and the walls of the sections 1b and 1c of the sleeve. Each of said washers 6 is serrated along its outer edge in a manner corresponding to that of the above-mentioned striations 1f of the sleeve.

In order to ensure the axial and angular locking of the cage 2 inside the sleeve 1, the annular space defined at each end of the arrangement by the sleeve 1, the cage 2 and washers 6 is closed by a collar 7 covering also the transverse surfaces of the cage 2.

Each of said collars is formed by plastic material cast in said location once the cage 2 and its balls 4 have been fitted inside the sleeve 1. The mass forming the collar sets then over the sleeve and the cage and enters in particular the annular groove 2d. Its adherence to such parts is considerably improved by the striations 10 provided on the latter. As a matter of fact, the plastic material enters said striations and forms somewhat the equivalent of a resistant series of teeth.

The collars 7 are preferably made of thermosetting resin such as that sold under the registered trade name Araldite, but obviously other plastic materials may also be used such as those sold under the registered trade name Nylon.

My invention is obviously not limited to the arrangement illustrated and described and, in particular, it will be readily understood that the axial locking of the cage inside the sleeve may be obtained by means of a single collar engaging only one end of said part, or else, according to further embodiments of my invention, I may resort to one or more small masses of plastic material of any desired shape arranged at one or both ends of the arrangement.

Furthermore, it is obvious that the setting of the plastic material on the sleeve and cage guiding the balls may also be executed in other manners; thus, for instance, it is possible to merely provide one or more recesses in the cooperating surfaces of the sleeve and cage inside which recesses the plastic material is allowed to set.

According to a further modification, said recesses may, in contradistinction, be replaced by projections over which the plastic material is then cast. It is also possible to associate the recesses and projections by providing the former on one of the parts of to be interconnected and the other on the other part.

Lastly, angular locking may also be obtained by shaping the cooperating surfaces of the sleeve and cage in a manner such that they have at least one flat or rounded small surface so as to modify the cylindrical symmetry of said surfaces after which the plastic material is cast in a manner such that it engages one or more of said small surfaces on either of the cooperating parts.

It is also possible of course to resort to a sleeve the inner surface of which is provided with one or two annular grooves similar to those provided in the cage and which may be striated or otherwise over the entire bottom thereof or a fraction of said bottom.

It should lastly be mentioned that when the plastic mass forms a collar as illustrated, it is of advantage to provide the latter with one or more openings as also in the ring adjacent thereto, said openings allowing for instance a circulation of oil for lubricating the balls or of a suitable liquid or of compressed air for the cleaning of the arrangement.

What I claim is:

In combination in an arrangement for axially guiding a cylindrical member, comprising a sleeve coaxial with said cylindrical member and provided in its inner surface with spaced annular grooves, a tubular cage fitted between said sleeve and the cylindrical member and defining annular passageways at each end of said arrangement, said sleeve also being provided with grooves opening partly into registry with said cylindrical member and with the sleeve, and with annular grooves at each end thereof, said cage and sleeve being furthermore provided with striations parallel to said cylindrical member extending over a part of the length of the bottom of the annular grooves in said cage and sleeve, balls carried inside the second-mentioned grooves and guiding the cylindrical member axially with reference to the sleeve, a pair of washers serrated along their outer edge to correspond to said striations of said sleeve and closing said passageways and defining an annular space at each end of said arrangement; and a mass of plastic in said space in registry with said cage and said sleeve and holding the cage in position in said sleeve, said plastic material extending at least a fraction of the length of said annular grooves and of said striations.

References Cited

UNITED STATES PATENTS

| | | | |
|---|---|---|---|
| 613,712 | 11/1898 | Parkin | 308—186 |
| 819,753 | 5/1906 | Glover | 308—186 |
| 2,428,932 | 10/1947 | Fawick. | |
| 2,572,411 | 10/1951 | Watt | 308—184 |
| 2,674,505 | 4/1954 | Pfenninger | 308—184 |
| 2,876,319 | 3/1959 | Held | 338—184 X |
| 2,981,569 | 4/1961 | Danly | 308—66 |
| 3,112,141 | 11/1963 | Peros | 308—184 |
| 3,202,749 | 8/1965 | White | 308—238 X |
| 3,208,804 | 9/1965 | Strenert | 308—236 X |

FOREIGN PATENTS

| | | |
|---|---|---|
| 755,957 | 12/1933 | France. |
| 1,123,886 | 2/1962 | Germany. |
| 600,960 | 9/1945 | Great Britain. |
| 863,497 | 3/1961 | Great Britain. |
| 514,046 | 2/1954 | Italy. |

MARTIN P. SCHWADRON, *Primary Examiner.*

EDGAR W. GEOGHEGAN, *Examiner.*

L. L. JOHNSON, *Assistant Examiner.*